(12) United States Patent
Lamont

(10) Patent No.: US 8,671,830 B2
(45) Date of Patent: Mar. 18, 2014

(54) COOKING APPLIANCE HAVING INTEGRATED BATTER IMPRINTING SURFACES

(76) Inventor: William D. Lamont, Shelby Township, MI (US)

( * ) Notice: Subject to any disclaimer, the term of this patent is extended or adjusted under 35 U.S.C. 154(b) by 0 days.

(21) Appl. No.: 13/462,814

(22) Filed: May 3, 2012

(65) Prior Publication Data

US 2013/0112086 A1 May 9, 2013

Related U.S. Application Data

(63) Continuation of application No. 12/109,941, filed on Apr. 25, 2008, now abandoned.

(60) Provisional application No. 60/913,954, filed on Apr. 25, 2007.

(51) Int. Cl.
*A47J 37/06* (2006.01)

(52) U.S. Cl.
CPC .............. *A47J 37/0611* (2013.01); *A47J 37/06* (2013.01)
USPC .................................. 99/376; 99/349; 99/372

(58) Field of Classification Search
CPC ...................................................... A47J 37/0611
USPC ................... 99/367, 369, 372, 374, 375, 376, 99/380–384, 419, 441
See application file for complete search history.

(56) References Cited

U.S. PATENT DOCUMENTS

| 1,742,945 | A | * | 1/1930 | Banff ............................... 99/380 |
| 1,947,124 | A | * | 2/1934 | Clauss ............................. 99/380 |
| 1,990,412 | A | * | 2/1935 | Merritt ............................ 99/373 |
| 2,243,137 | A | * | 5/1941 | Vaughan ......................... 99/381 |
| 2,358,452 | A | * | 9/1944 | Garstang ......................... 99/376 |
| 2,791,960 | A | * | 5/1957 | De Carlo Pietropinto ...... 99/439 |
| 3,048,922 | A | * | 8/1962 | Steinkemper et al. ......... 425/161 |
| 5,671,658 | A | * | 9/1997 | Macasaet ........................ 99/384 |
| 6,429,409 | B1 | * | 8/2002 | Siu ............................. 219/450.1 |
| 7,180,034 | B1 | * | 2/2007 | Oppenheimer ............... 219/386 |
| 2005/0039737 | A1 | * | 2/2005 | Haber ............................. 126/30 |

\* cited by examiner

*Primary Examiner* — Henry Yuen
*Assistant Examiner* — Thien S Tran
(74) *Attorney, Agent, or Firm* — Vincent Re PLLC

(57) ABSTRACT

A cooking device for cooking both a stick-mounted food item and a fluid batter. The cooking device including a pair of opposed cooking plates that receive the food item and batter in a reservoir. The reservoir includes raised and recessed surfaces that imprint a recognizable design, shape, or indicia on the outer surface of the cooked batter. The cooking plates are rotatable together about a central axis to allow the batter to flow around the food item as the batter and food item cook.

10 Claims, 5 Drawing Sheets

COOKING APPLIANCE HAVING INTEGRATED BATTER IMPRINTING SURFACES

CROSS-REFERENCE TO RELATED APPLICATION

This application is a continuation of U.S. patent application Ser. No. 12/109,941 filed Apr. 25, 2008, which claims priority of U.S. Provisional Patent Application filed Apr. 25, 2007 having Ser. No. 60/913,954.

FIELD OF THE INVENTION

This invention relates to cooking appliances and more particularly relates to a cooking appliance for cooking a food item such as a hotdog skewered on a stick and embedded in a batter.

BACKGROUND OF THE INVENTION

Conventionally, food items, such as hotdogs, are sometimes prepared by covering the food item in a batter and then dipping it into a deep fryer to fry the food item. Corndogs are typical of this cooking process by piercing a frankfurter or hot dog lengthwise with a stick and then dipping the hot dog in a cornbread batter. The batter-coated hot dog is then immersed into a deep fryer to cook the corndog. The food item thus becomes saturated with undesirable fats and cholesterol in addition to the fat and cholesterol already in the hot dog and batter.

In addition to the dietary drawbacks of deep frying, using this type of cooking method is also undesirable as many users do not have proper venting for a fryer. The use of hot oil to fry the corndogs also increases the risk of operator injury as well as the increased chance of a fire.

Therefore, it is desirable to use a baking process to cook batter-coated food items. Baking the food item results in a product with virtually none of the problems associated with frying.

SUMMARY OF THE INVENTION

A cooking appliance cooks or bakes a food item prepared to be cooked on a stick with a batter. The cooking appliance includes a pair of opposed heated cooking plates. Each cooking plate includes a primary reservoir/cavity and a secondary reservoir/cavity for receiving the batter and the food item therein. The cooking plates are hinged together whereby the plates can be abutted together such that the reservoirs and the cavities create a cooking enclosure to cook the food item and the batter therein. A stick receiving bung retains the stick in an orientation such that the food item is coaxial with the primary reservoir. Each secondary reservoir includes raised and recessed surfaces which cooperative define a recognizable image. Upon pouring and cooking batter within the secondary reservoirs, this image is transferred to the outer surface of the cooked battered food item.

BRIEF DESCRIPTION OF THE DRAWINGS

Advantages of the invention will be readily appreciated as the same becomes better understood by reference to the following detailed description when considered in connection with the accompanying drawings, wherein.

DETAILED DESCRIPTION OF THE PREFERRED EMBODIMENT

Figure 1:
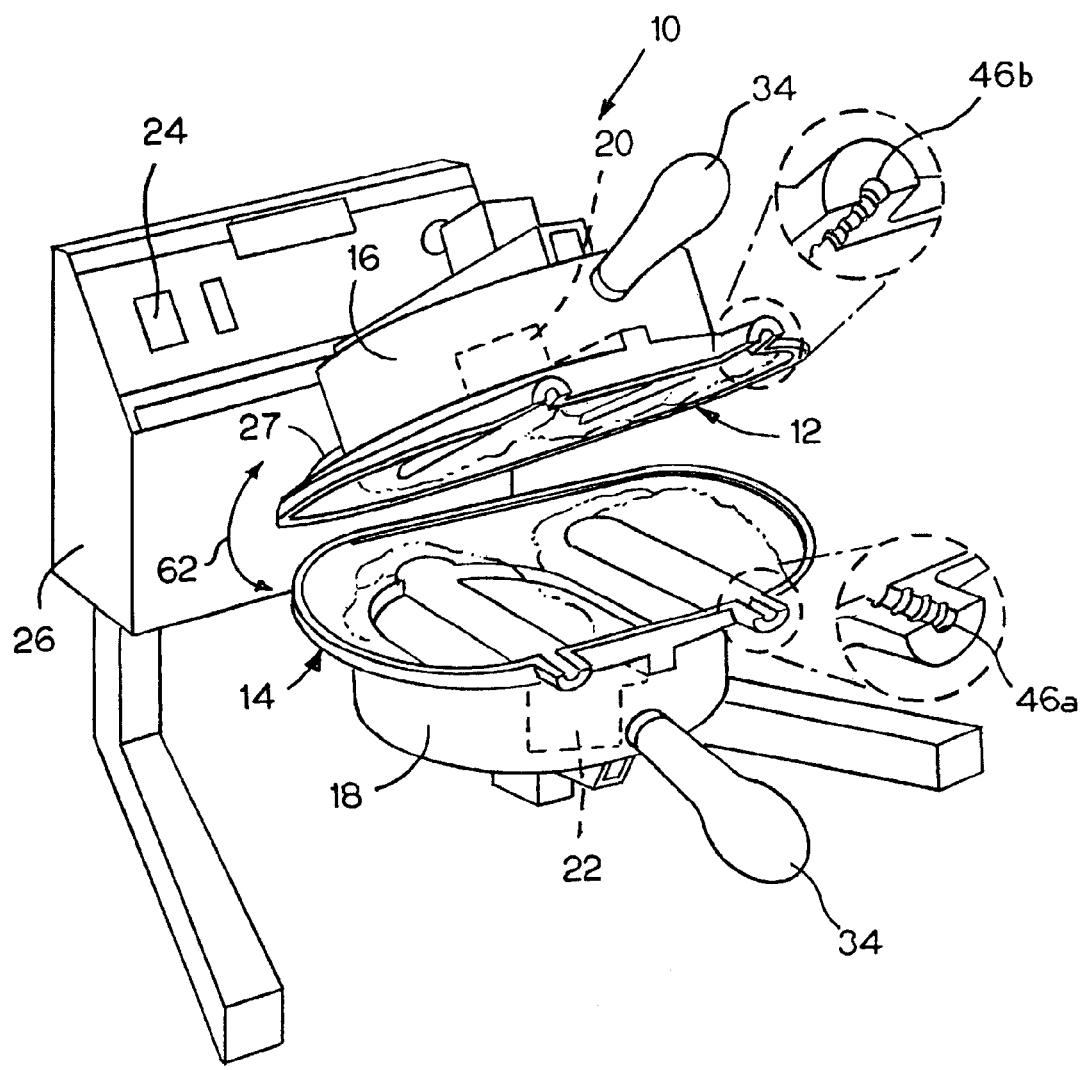
FIG. 1 is a perspective view of one embodiment of the invention in a partially open position.

Referring now to FIG. 1, a cooking appliance 10 is shown having a pair of opposed cooking plates 12, 14. These cooking plates receive and cook at least one food item 40 and a generally fluent batter 41.

Upper cooking plate 12 is mounted to an upper housing 16, while lower cooking plate 14 is mounted to a lower housing 18. Upper housing 16 includes a first heating means 20 which is operative to heat the upper cooking plate 12. Similarly, lower housing 18 includes a second heating means 22 to heat the lower cooking plate 14. Heating of the cooking plates is accomplished by commercially available electric resistance heating or comparable heating element and will not be given a detailed description. Also a temperature controls means 24, preferably disposed upon a supporting control body 26, may be of the conventional type such as a thermostat and it will be assumed that their operation is understood. Each cooking plate is fabricated from a material that will readily transfer thermal energy when an electric current is supplied to heating means 20, 22.

The housings 16, 18 are pivotally coupled together at a rearward 27 end such that the two cooking plates 12, 14 have their cooking surfaces 30, 32 facing toward each other. In the preferred embodiment, cooking surfaces 30, 32 are coated with a non-stick material, such as that sold under the trademark TEFLON. Each housing 16, 18 preferably includes a protruding handle 34 that allows a user to open and close the pivoting cooking plates 12, 14 of the appliance 10.

In the open position, the two plates 12, 14 are preferably angled apart greater than ninety degrees to ensure that the upper plate and housing do not unintentionally close or fall down upon the lower plate/housing. In other embodiments, locking means (not shown) selectively retains the upper housing and plate in an open position. As will be discussed in greater detail below, in the closed position, the upper plate 12 covers the lower plate 14, such that the outer peripheral edges of the plates 12, 14 abut to enclose the cooking surfaces 30, 32. It is preferably in this closed position, that the appliance 10 cooks the food items.

Figure 2:
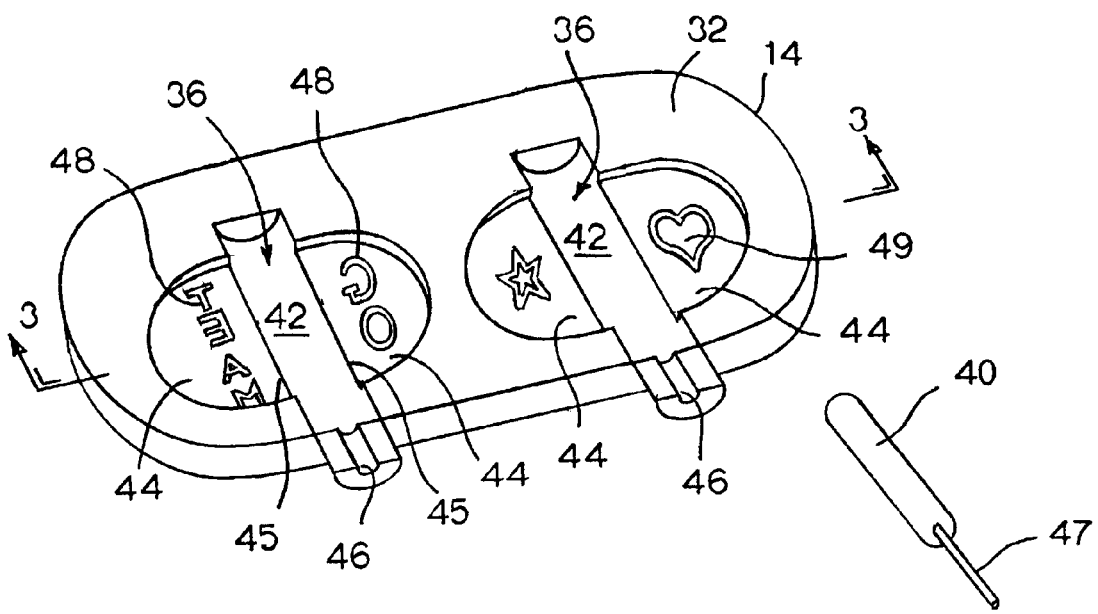
FIG. 2 is a perspective view of a lower cooking plate.
Figure 3:
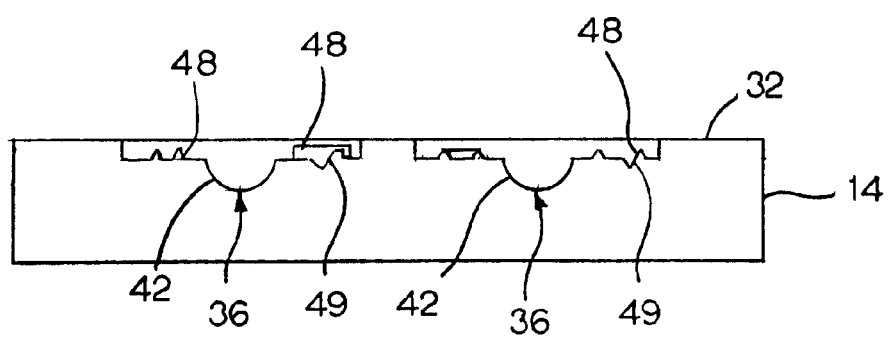
FIG. 3 cross-sectional view through line 3 shown in FIG. 2.
Figure 4:
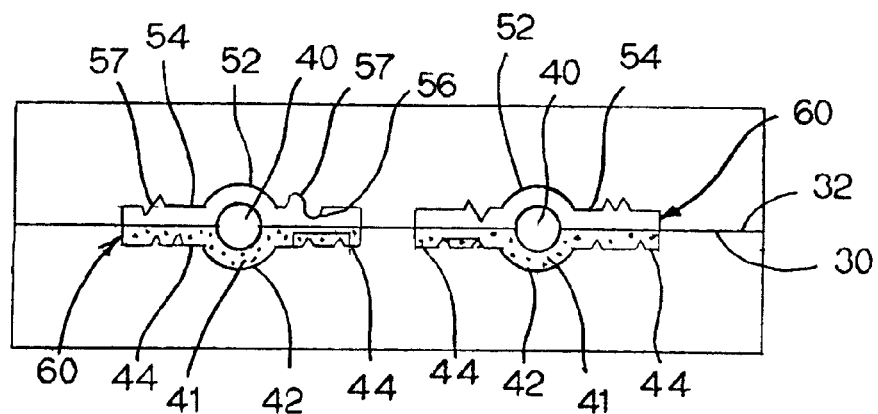
FIG. 4 is a cross-sectional view, similar to FIG. 3, illustrating the upper and lower cooking plates in a closed position.

Referring now to FIGS. 2-4, lower cooking plate 14 is shown having a plurality of molds or reservoirs, generally shown at 36. Each reservoir 36 receives a food item 40 and batter 41 therein. In the preferred embodiment, appliance 10 cooks a plurality of food items 40 at one time, however, it should be appreciated that appliance 10 can be made such that only a single food item is prepared at one time.

Each of the plurality of reservoirs 36 includes an elongated semi-cylindrical shaped primary reservoir 42 and at least one secondary or side reservoir 44. The secondary reservoirs 44 are in fluid communication with the primary reservoir 20. In the embodiment shown in the FIGS. 2-4, each of the reservoirs 36 include one primary reservoirs 42 and two secondary reservoirs 44 extending along each longitudinal side 45 of the primary reservoir 42. As shown, batter 41 fills much of the primary reservoir 42 and the secondary reservoirs 44 when an operator of the appliance 10 is preparing to cook a food item.

Each primary reservoir 42 fluidly communicates with an axially aligned semi-cylindrical bung 46a which extends from the front face of the lower cooking plate 14 and includes an elongated channel which is adapted to receive a stick 47.

As best illustrated in FIGS. 2 and 3, each of the secondary reservoirs 44 may have a contoured peripheral shape having both raised regions 48 and recessed regions 49 which cooperate to form an image design. The particular outer shape and inner image of reservoir 44 is a design choice and can include character or figure outlines, imagery, reliefs, letters or numerals. It should be appreciated that the design formed by regions 48, 49 allows a user to place a recognizable design or message upon the outer surface of the cooked batter 41.

Similarly, the upper cooking plate 12 includes a plurality of cavities 52, 54 that complement the plurality of reservoirs 42, 44. More specifically, the plurality of primary cavities 52 complement the plurality of primary reservoirs 42, while a plurality of secondary cavities 54 complement the plurality of secondary reservoirs 44. Each cavity 52, 54 is substantially the same in construction as reservoirs 42, 44. That is, secondary cavity 54 also includes raised and recessed regions 56, 57 that cooperate to form a recognizable image.

Each primary cavity 52, like primary reservoir 42, also fluidly communicates with an axially aligned semi-cylindrical bung 46b which is adapted to receive a stick 47. When the cooking plates 12, 14 are in the closed position, the two bungs 46a, 46b mounted to each plate cooperate to define a stick 47 sized through bore that is in fluid communication with one of the reservoirs 36.

In still other embodiments, not only do the secondary reservoirs 44 and cavities 54 include the image forming regions, but the primary reservoirs 42 and cavities 52 also include similar raised and recessed regions that also form a recognizable image upon the outer surface of the cooked battered food item 40. Further, the reservoirs 42 and cavities 52 along with the secondary reservoirs may cooperate to define the outer shape or profile of an animal (e.g., a lobster or dinosaur), a body part (e.g., a turkey leg), or substantially any other readily recognizable object (e.g., a football).

Pivoting means 27 located at the rearward sides of housings 16, 18 allows the surface 30 of upper plate 12 to abut the surface 32 of lower plate 14. When the plates 12, 14 abut, each of the cavities 52, 54 is aligned with each of the complementary reservoirs 42, 44 to substantially create a plurality of enclosures 60 within which the food items 40 and the batter 41 reside while the food items 40 are being cooked.

In one embodiment of the invention, the batter 41 expands during cooking to fill the entire enclosure 60. As a result, regions 48, 49, 56, and 57 all produce a recognizable image or design upon the outer surface of the battered food item. In still another embodiment, each housing 16, 18 is rotatably mounted to control body 26 to allow the housings and cooking plates to rotate 180 degrees about a central axis (i.e., in the directions of arrow 62) once the plates are disposed in a closed position. In this manner, the batter 41 is allowed to flow around food item 40 and into upper plate cavities 52, 54.

In operation, batter 41 is poured into the primary and secondary reservoir(s) 42, 44. It is contemplated that a fill line or marker may be used to indicate how much batter should be used. A food item 40 that is impaled longitudinally by an elongated stick 47 is placed within primary reservoir 42 and is preferably rotated to ensure the item 40 is coated with the batter 41. The food item 40 is laid within reservoir, such that a portion of stick 47 is disposed within bung 46, while the exposed end of stick 47 projects out of appliance 10.

Once the above process is completed, the user pivots the upper housing 16 down onto the lower housing 18, thereby abutting surfaces 30, 32 and forming a plurality of enclosures 60 surrounding each food item 40. Heating means 20, 22 heat the cooking plates 12, 14 to cook both the food item 40 and the surrounding batter 41. As the batter 41 cooks, the raised and recessed regions 48, 49, 56 and 57 found within the enclosures 60, along with the peripheral shape of the enclosures secondary cavities/reservoirs, imprint an image upon the outer surface of battered food item 40.

Figure 5:
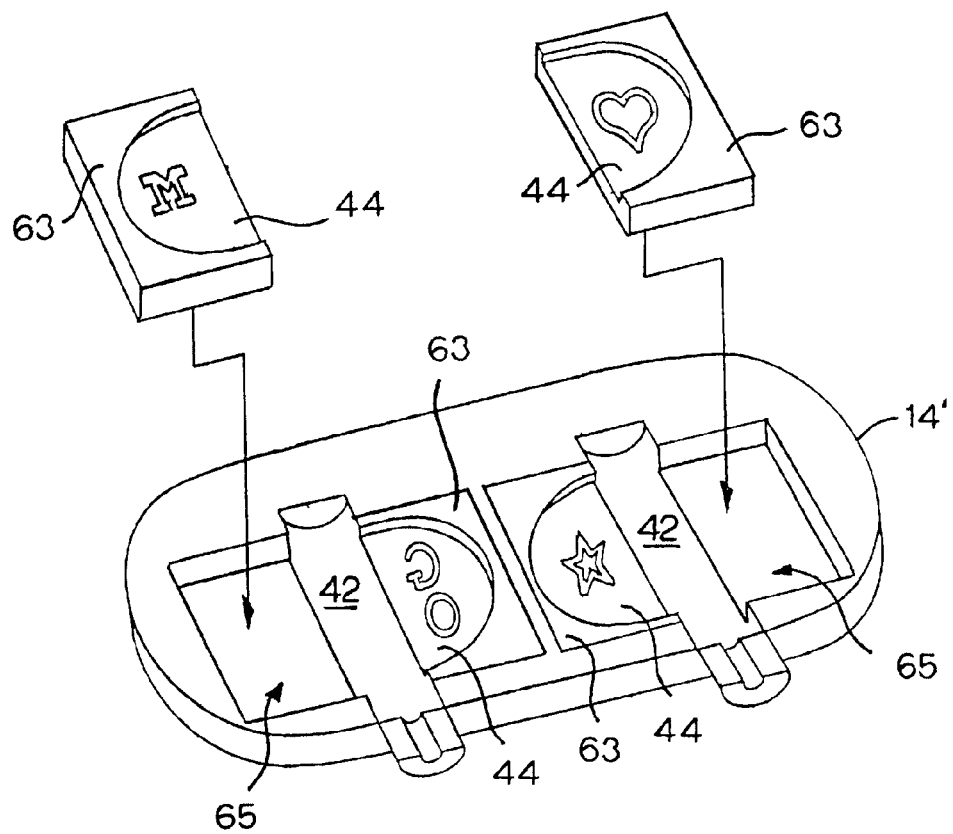
FIG. 5 is a perspective view of another embodiment of a lower cooking plate having removable inserts.

In one embodiment of the invention, as illustrated in FIG. 5, an exemplary lower cooking plate 14' is includes inserts 63 that are removably coupled to the cooking plates 14'. Each insert 63 has an outer profile that is complementary to a recess 65 formed in the plate 14'. The inserts 63, in this embodiment are mounted adjacent to the primary reservoir 42 formed in the plate 14'. The inserts include at least one secondary reservoir 44 that, when mounted within the complementary recess 65, are fluidly coupled to the primary reservoir 42. As described above, these secondary reservoirs 44 may be configured to form a design or indicia in the cooked batter surrounding a food item.

The removable inserts 63 allow a user of appliance 10 to readily alter the design of the image formed onto the cooked food item by mounting different inserts into the recesses 65. It is contemplated that each insert 63 is coupled to its respective plate 14 in a manner which allows for rapid removal and replacement, such as magnetic fasteners. It is contemplated in this embodiment that inserts, such as insert 63 may also be used within the upper cooking plate 12.

Figure 6:
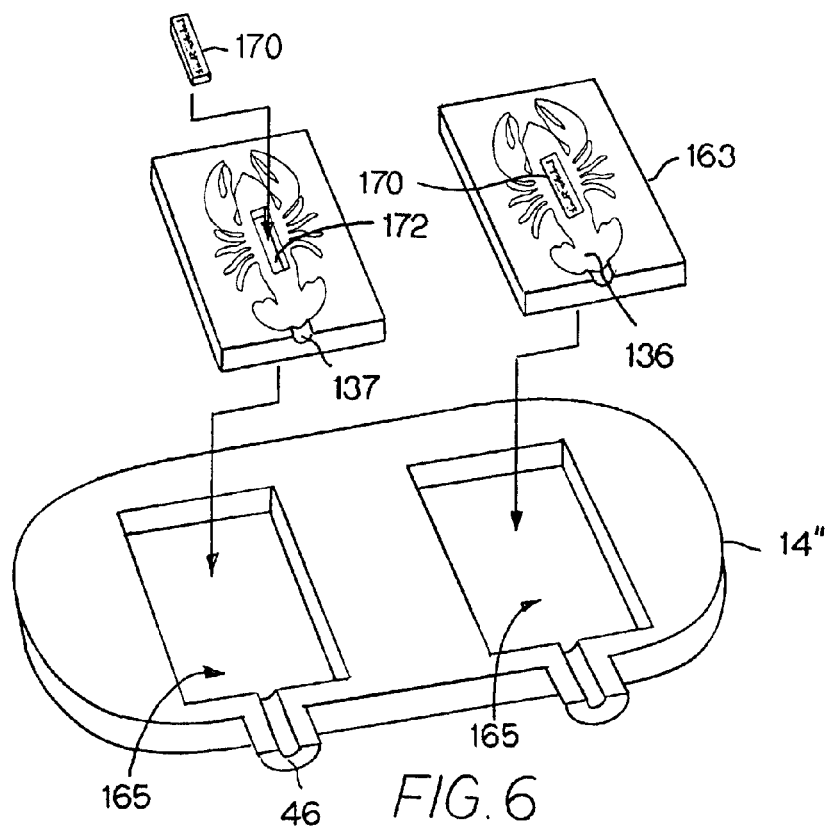
FIG. 6 is a perspective view of yet another embodiment of a lower cooking plate having removable inserts for the entire batter-receiving form.
Figure 7:
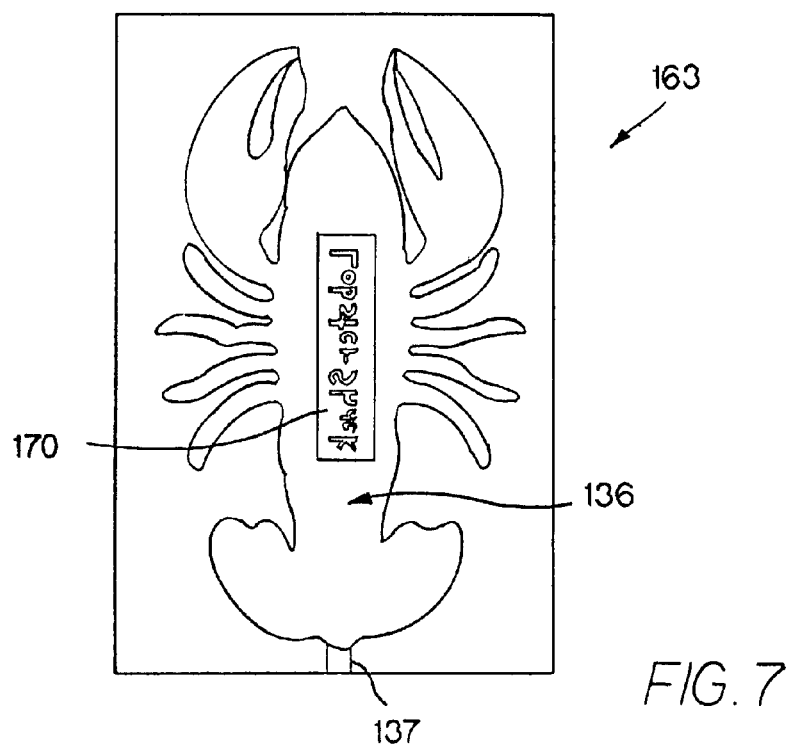
FIG. 7 is a top enlarged view of a removable insert for the embodiment illustrated in FIG. 6.

Referring now to FIGS. 6 and 7, another non-limiting embodiment of the invention is shown where the lower cooking plate, denoted 14", includes removable inserts 163. Inserts 163 are similar to inserts 63, but instead of providing interchangeable secondary reservoirs, inserts 163 replace both the primary and secondary reservoirs with a single reservoir 136. Reservoir 136 may be configured in substantially any shape or profile that will receive a fluid batter material (and encased food item). In the non-limiting example shown in FIGS. 6 and 7, the reservoirs 136 are configured to cause the cooked batter/coating to be in the shape of a lobster. Each reservoir 136 includes a semi-circular passage 137 that is axially aligned with the channel formed in bung 46 of the plate 14".

To allow each insert 163 to be customizable, each reservoir 136 may also include at least one removable nameplate or secondary insert 170. This secondary insert 170 is mounted within a complementarily shaped recess 172 formed either in or adjacent to reservoir 136. Secondary insert 170 preferably includes indicia, such as a restaurant's name or slogan that will be formed into the coating surrounding a cooked food item.

Inserts 63, 163 are preferable formed from the same material as their respective plates. In other embodiments, however, these removable inserts may be substantially any cookware-grade material, such as silicone. It should be appreciated that by varying the material of the inserts 63 containing the typically shallower secondary reservoirs 44, the cooking time for the material received in the insert 63 can be made to match the cooking time of the food item inserted into the primary reservoir. To that end, other embodiments of each insert 63, 163 may include insulating materials along portions of the reservoirs to control the amount of heat transferred to those portions.

Figure 8:
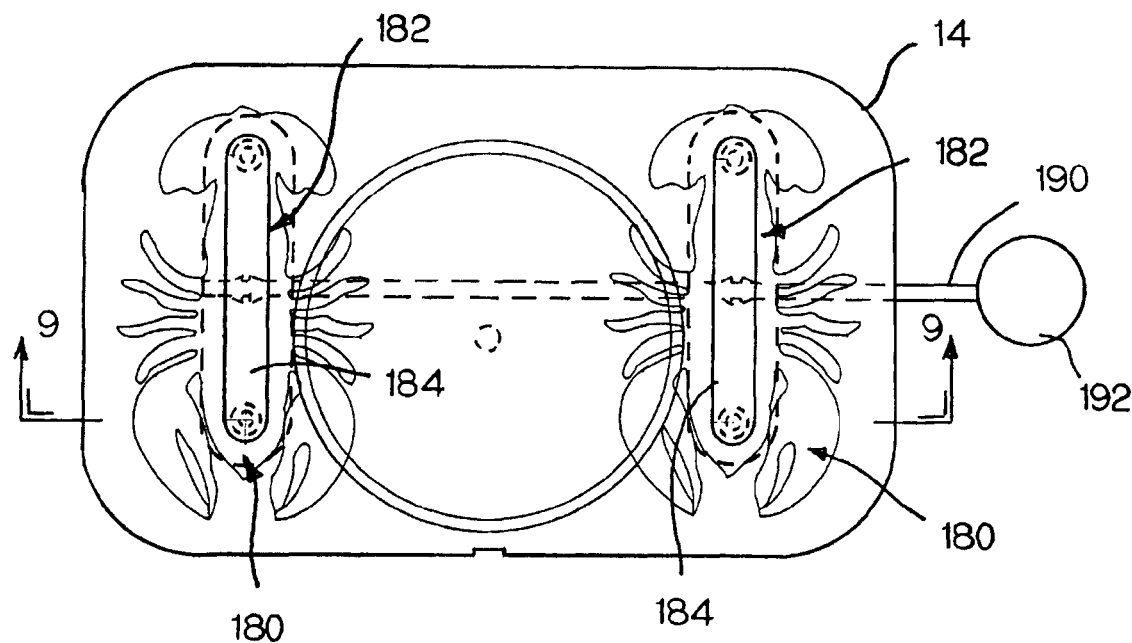
FIG. 8 is a top view of a lower cooking plate including a portion of the mold including a lifting body to assist in removing the cooked food item from the mold.
Figure 9:
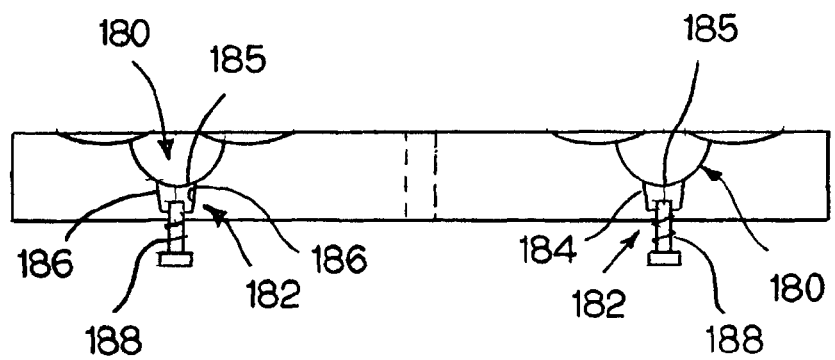
FIG. 9 is a side section view through line 9-9 in FIG. 8.

Referring now to FIGS. 8 and 9 an alternate embodiment of a lower plate 14 having a pair of molds 180 (i.e., combined primary and secondary reservoirs 42, 44) formed therein. In this embodiment, the molds 180 include a means 182 for assisting in the extraction of a cooked food item from each of the molds.

In the embodiment shown, this extraction means 182 includes a lifting body 184 at the lower portion of the mold which resides within and is formed separately from the remaining mold 180. The top surface 185 of body 184 is shaped to complete the desired shape of the mold, while the side walls 186 are tapered and fit within complementarily-shaped wells formed in the plate. Each lifting body 184 preferably runs along most of the longitudinal length of its mold 180. A pair of resilient members, such as springs 188 biases the body 184 down into the well, such that the top surface 185 is substantially contiguous with the rest of the mold surface. The springs 188 are preferable mounted proximate to the two opposing longitudinal ends of the body 184.

In this embodiment, a central shaft 190 passes through both lifting bodies 184 in the plate. Manipulating a handle 192 on the shaft 190 (by either rotating or lifting) overcomes the resilient members' 188 downward pull causes the lifting bodies 184 to and rise vertically relative to the otherwise stationary mold 180.

The foregoing descriptions and drawings of the invention are explanatory and illustrative only, and various changes in shape, sizes and arrangements of parts as well certain details of the illustrated construction may be made without departing from the true spirit of the invention.

The invention claimed is:

1. A cooking appliance for cooking both a food item mounted upon an end of an elongated stick and a fluid batter surrounding the food item, comprising:
   a cooking plate having an elongated semi-cylindrical primary reservoir which is recessed beneath a planar cooking surface, said cooking plate including an insert recess adjacent to a longitudinal edge of said primary reservoir; and
   a cooking insert that is shaped complementary to said insert recess, said insert including a secondary cooking reservoir formed in a top surface, said secondary reservoir is defined by an outer peripheral wall extending downwardly from said top surface and twice intersecting a first edge of said insert, wherein said insert is removably mounted within said insert recess with said first edge against said longitudinal edge, whereby said secondary reservoir is in fluid communication with said primary reservoir when the insert is mounted within said insert recess;
   wherein said outer peripheral wall of said insert and said primary reservoir cooperatively define a single batter-receiving cooking cavity; and
   wherein said secondary cooking reservoir comprises raised and recessed regions configured to create upon a corresponding portion of the cooking fluid batter a decorative image.

2. A cooking appliance as defined in claim 1, wherein said decorative image comprises a logo associated with a sports team.

3. A cooking appliance as defined in claim 2, wherein said insert recess breaks into the longitudinal edge of said primary reservoir.

4. A cooking appliance for cooking both a food item mounted upon an end of an elongated stick and a fluid batter surrounding the food item, comprising:
   a lower cooking plate having a first planar cooking surface, said lower cooking plate including an elongated primary reservoir recessed into the first cooking surface and a first insert mounting recess, said first insert mounting recess having one edge that breaks into a longitudinal edge of said elongated primary reservoir;
   an upper cooking plate having a second planar cooking surface including an elongated primary cavity recessed into the second cooking surface and a second insert mounting recess, said second insert mounting recess having one edge that breaks into a longitudinal edge of said elongated primary cavity, said upper cooking plate is movably coupled to the lower cooking plate, such that the upper plate is movable from a closed position where the second cooking surface covers the first cooking surface to an open position where the second cooking surface is remote from the first cooking surface;
   a first cooking insert that is removably mounted within said first insert mounting recess, said first cooking insert including a secondary reservoir that extends from an inner edge of said first cooking insert, wherein the inner edge of the first cooking insert is disposed along said longitudinal edge of the primary reservoir fluidly coupling said secondary reservoir to said primary reservoir, whereby said stick-mounted food item may be disposed within said primary reservoir and said fluid batter flows between said primary reservoir and said secondary reservoir to cook said batter therein;
   a second cooking insert that is removably mounted within said second insert mounting recess, said second cooking insert including a secondary reservoir that extends from an inward edge of said second cooking insert, wherein the inward reservoir edge is disposed along the longitudinal edge of the primary cavity; and
   wherein said first cooking insert and said second cooking insert each comprise raised and recessed regions configured to create a decorative image upon the cooking fluid batter; and
   wherein said first cooking insert and second cooking insert are each fastened within said appliance with a magnetic fastener.

5. A device for cooking both a food item mounted upon an end of an elongated stick and a fluid batter surrounding the food item, comprising:
   a lower cooking surface, a portion of said lower cooking surface comprising a removable lower insert, wherein the lower cooking surface includes a cooking cavity, said cooking cavity comprising an elongated primary reservoir and a secondary reservoir adjacent to and fluidly coupled to said primary reservoir, wherein said secondary reservoir is formed within said lower removable insert and breaks into said primary reservoir to cooperatively define a continuous periphery of said cooking cavity, whereby said stick-mounted food item may be disposed within said primary reservoir and said fluid batter flows between and is cooked within said primary reservoir and said secondary reservoir;
   an upper cooking surface, said upper cooking surface is movably coupled to the lower cooking surface, such that the upper cooking surface is movable from a closed position where the upper cooking surface covers the lower cooking surface to an open position where the upper cooking surface is remote from the lower cooking surface; and wherein said secondary reservoir comprises raised and recessed regions configured to create a decorative image upon the cooking fluid batter; and wherein said continuous periphery of said cooking cavity comprises a concave shape configured to create around a corresponding perimeter of the cooked fluid batter a concave curved shape corresponding to said decorative image.

6. A device as defined in claim 5, wherein said upper cooking surface includes a second cooking cavity, a portion of said upper cooking surface comprising an upper removable insert, wherein said second cavity is defined by an upper elongated primary reservoir and an upper secondary reservoir which breaks into said upper primary reservoir, wherein said upper secondary reservoir is formed within said upper removable insert.

7. A device as defined in claim 5, wherein said primary reservoir comprises raised and recessed regions;

wherein said primary reservoir is configured to create a wider portion of said fluid batter as compared to a narrower portion of said fluid batter that is created by said secondary reservoir; and wherein said raised and recessed regions of said primary reservoir and said raised and recessed regions of said secondary reservoir are configured to create said fluid batter comprising a decorative pattern spanning said wider portion and said narrower portion.

8. A cooking appliance as defined in claim 1, wherein said cooking insert is removably mounted within said insert recess with a magnetic fastener.

9. A cooking appliance as defined in claim 1, wherein said outer peripheral wall includes a curved shape corresponding to said decorative image.

10. A cooking appliance as defined in claim 9, wherein said curved shape comprises a concave shape.

* * * * *